US012084322B2

(12) United States Patent
Momin et al.

(10) Patent No.: US 12,084,322 B2
(45) Date of Patent: Sep. 10, 2024

(54) ATTACHMENT FOR A RETRACTABLE LANYARD

(71) Applicants: Riyaz Momin, Richmond, TX (US); Kiran Karedia, Richmond, TX (US); Noman Ali, Richmond, TX (US); Ahmed Maknojia, Richmond, TX (US)

(72) Inventors: Riyaz Momin, Richmond, TX (US); Kiran Karedia, Richmond, TX (US); Noman Ali, Richmond, TX (US); Ahmed Maknojia, Richmond, TX (US)

( * ) Notice: Subject to any disclaimer, the term of this patent is extended or adjusted under 35 U.S.C. 154(b) by 606 days.

(21) Appl. No.: 17/378,688

(22) Filed: Jul. 17, 2021

(65) Prior Publication Data

US 2023/0013107 A1 Jan. 19, 2023

(51) Int. Cl.

| | |
|---|---|
| ***B66D 1/36*** | (2006.01) |
| ***A45F 5/00*** | (2006.01) |
| ***B65H 75/40*** | (2006.01) |
| ***B65H 75/44*** | (2006.01) |
| ***B65H 75/48*** | (2006.01) |
| ***B66D 1/02*** | (2006.01) |

(52) U.S. Cl.

CPC ................ *B66D 1/36* (2013.01); *A45F 5/004* (2013.01); *B65H 75/406* (2013.01); *B65H 75/4471* (2013.01); *B65H 75/486* (2013.01); *B66D 1/02* (2013.01)

(58) Field of Classification Search

CPC .. B66D 1/02; B66D 1/36; A45F 5/004; B65H 75/406; B65H 75/486; B65H 75/4471

USPC .......................................................... 224/162

See application file for complete search history.

(56) References Cited

U.S. PATENT DOCUMENTS

| | | | | |
|---|---|---|---|---|
| 4,964,370 A * | 10/1990 | Peterson | A01K 27/004 | 242/379 |
| 7,150,247 B2 * | 12/2006 | Eulette | A01K 27/004 | 119/796 |
| 9,961,882 B2 * | 5/2018 | Woods | A01K 27/009 | |
| D954,536 S * | 6/2022 | Momin | D8/356 | |
| 2006/0163412 A1 * | 7/2006 | Szarkowski | B65H 75/4434 | 242/384 |
| 2008/0042000 A1 * | 2/2008 | Horton | A45F 5/004 | 119/796 |
| 2010/0162966 A1 * | 7/2010 | McFarland | A01K 27/001 | 119/858 |
| 2012/0153064 A1 * | 6/2012 | Votel | B65H 75/4434 | 242/378.4 |
| 2017/0231375 A1 * | 8/2017 | Moreau | B65H 75/446 | 224/162 |

* cited by examiner

*Primary Examiner* — Peter N Helvey

(74) *Attorney, Agent, or Firm* — Benjamin Aaron Adler

(57) ABSTRACT

Provided herein is a lanyard attachment for storing a lanyard. The lanyard attachment has a housing, means for releasably storing a lanyard in the housing, for example a rotatable spool, a guide at the proximal end of the housing to guide the lanyard into the housing and a holder at the distal end from which an object is suspended. Also provided is a retractable lanyard in which a cord or lanyard is stored in a coiled configuration within the housing and a system for releasably storing a lanyard in the lanyard attachment.

17 Claims, 5 Drawing Sheets

ATTACHMENT FOR A RETRACTABLE LANYARD

BACKGROUND OF THE INVENTION

Field of the Invention

The present invention relates to the fields of lanyards and wearable accessories for carrying items. More particularly, the present invention relates to an attachment for a retractable lanyard.

Description of the Related Art

Lanyards have long been used for supporting accessories and various items while simultaneously allowing the hands of the wearer to be free. Generally, a lanyard is a cord or strap worn around the neck, shoulder or wrist to carry such items as keys, identification cards, phones, watches, cameras, tickets, flash drives or various other items. Most lanyards have a loop of material with a fastener at one end that attaches to an aforementioned accessory. Further, the type of fastener generally varies according to the particular lanyard design or the item intended to be held. For example, common fasteners that are used include hook-and-loop fasteners, buckles, clasps, snaps and other fastener variations. As it is generally the function of a lanyard to securely hold an item, there is a desire to those having an ordinary skill in the art to provide an improved lanyard and fastening mechanism that more securely connects an accessory to a lanyard.

Hook-and-loop and loop fasteners have routinely been incorporated into the fastening mechanism for holding an item, including in lanyards. For example, US Patent Application Number 2008/0203127 particularly describes a lanyard having a series of fasteners supported thereon with one of the fasteners being a Velcro® hook-and-loop fastener. This hook-and-loop fastener may be used to support accessory items such as, but not limited to, a pacifier, a timer, a safety or recess whistle, a watch, lip balm, a pen, an ID badge, a fishing/sporting/hunting license, a ski lift ticket, a thumb drive, a flashlight, a carabineer, a wraparound fishing pole/fly rod to stabilize pole/rod while tying on new lure/fly, and a bell. Another design has integrated a hook-and-loop fastener into a bib for an infant in order to support a pacifier, such as shown in U.S. Design Patent D300,281.

In both instances referenced above a distal end of strip of material loops back over itself before connecting to a proximal end of the material wherein one of the distal and proximal end has the "hook" portion of the fastener which mates with the "loop" portion of the fastener on the opposite end. Accordingly, the hooks in the hook portion catch in the loops of the loop portion and the distal and proximal ends of the material are thereby bound together until such a time as when they are separated by peeling the two ends apart. When connected, an item is help between the ends of fabric and thereby supported.

Because of the shortcomings of prior art lanyards, there remains a need for an improved lanyard. The present invention fulfills this need and desire in the art.

SUMMARY OF THE INVENTION

The present invention is directed to a lanyard attachment. The lanyard attachment has a housing with a front portion and a back portion with means for releasably storing a lanyard disposed within the housing. A guide is formed across a proximal end of both of the front portion and the back portion to guide the lanyard into the housing and a holder is disposed at the distal end of the housing from which an object is removably suspendable.

The present invention also is directed to a retractable lanyard. The retractable lanyard has a housing that has a proximal end with a lanyard guide disposed thereon and open into the housing and a distal end with a hook and clip combination disposed thereon. A rotatable spool is disposed within the housing and has a first cavity with a first exteriorly flanged edge formed thereon, a second cavity with a second exteriorly flanged edge formed opposite to the first cavity and a lanyard attachment bar fastened between the first flanged edge and the second flanged edge of the spool. A manually controllable button assembly is disposed on an outer surface of the housing and extending through an aperture thereon into the first cavity of the rotatable spool and in operable contact therewith and a torsion spring is disposed within the second cavity of the rotatable spool and in operable contact therewith. A cord is looped over the lanyard guide and into the housing such that each end of the cord is secured to the lanyard attachment bar and retracted in a coiled configuration.

The present invention is directed further to a system for releasably storing a lanyard. The system has a housing with a rotatable spool contained therein and configured to releasably store the lanyard in a coiled configuration and a release button disposed through an aperture thereon in operable contact with the rotatable spool to manually control retraction or payout of the lanyard. The housing has a lanyard guide formed at a proximal end of the housing open into the housing and a hook and clip combination formed at a distal end of the housing to suspend an object therefrom.

Other and further aspects, features, benefits, and advantages of the present invention will be apparent from the following description of the presently preferred embodiments of the invention given for the purpose of disclosure.

BRIEF DESCRIPTION OF THE FIGURES

So that the matter in which the above-recited features, advantages and objects of the invention, as well as others which will become clear, are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

FIG. 2A illustrates the various elements of the lanyard attachment when the lanyard is stored within the attachment. FIG. 2B illustrates the various elements of the lanyard attachment when the lanyard is extendable from or retractable into the lanyard attachment. FIG. 2C is a magnification of part of FIG. 2A.

FIG. 3A shows the spool without the lanyard. FIG. 3B shows the lanyard in the extended configuration attached to the spool.

FIG. 3C shows the lanyard wound around the spool.

DETAILED DESCRIPTION OF THE INVENTION

Figure 1:
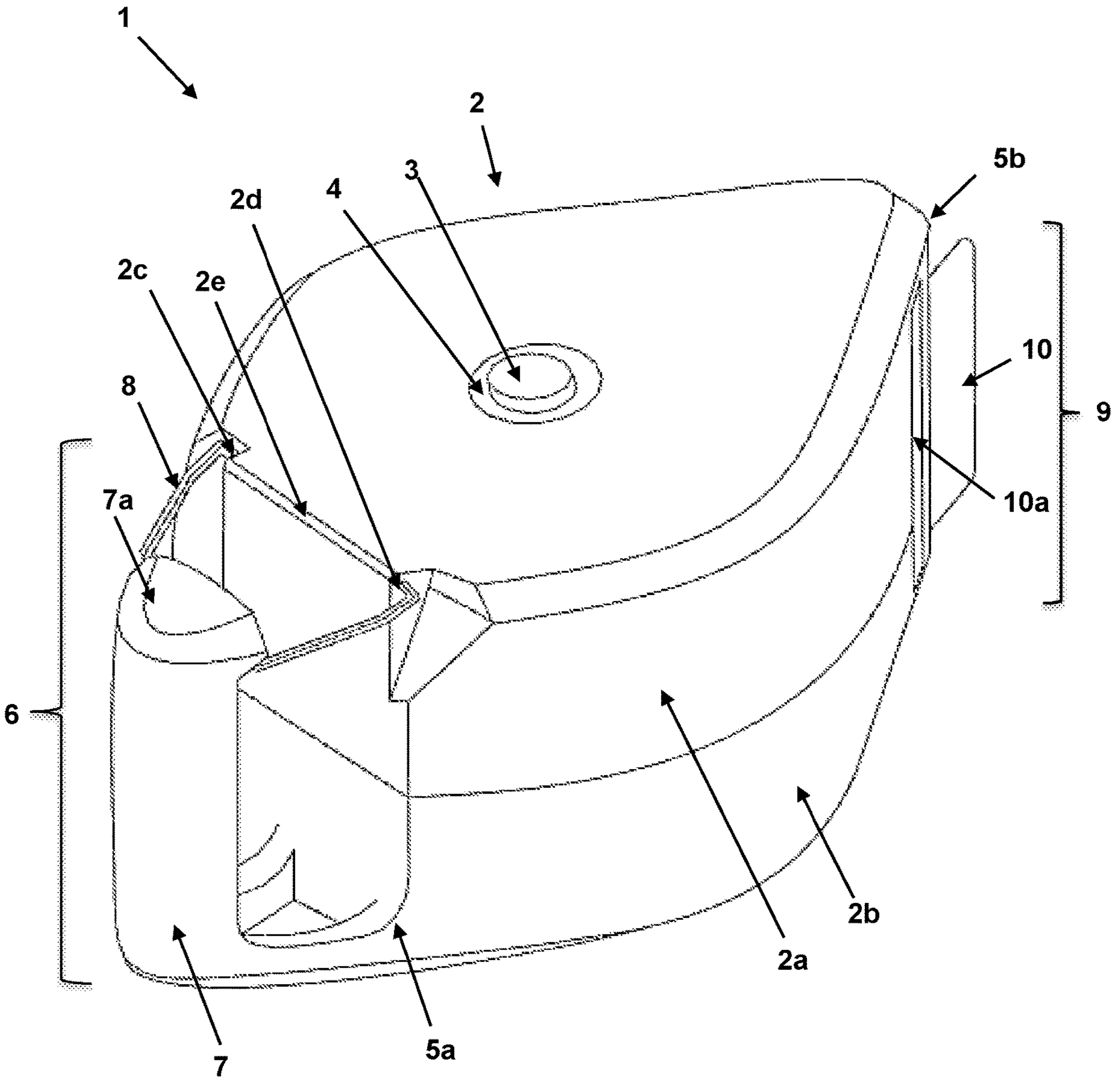
FIG. 1 shows a lanyard attachment.

As used herein, the term "a" or "an" when used in conjunction with the term "comprising" in the claims and/or the specification may mean "one," but it is also consistent with the meaning of "one or more," "at least one," and "one or more than one." Some embodiments of the invention may consist of or consist essentially of one or more elements, method steps, and/or methods of the invention. It is contemplated that any method described herein can be implemented with respect to any other method described herein.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, "comprise" and its variations, such as "comprises" and "comprising," will be understood to imply the inclusion of a stated item, element or step or group of items, elements, or steps but not the exclusion of any other item, element or step or group of items, elements, or steps unless the context requires otherwise. Similarly, "another" or "other" may mean at least a second or more of the same or different claim element or components thereof.

As used herein, the terms "proximal" and "distal" in reference to the housing disclosed herein refer to those components, features, parts and aspects thereof that are nearer or nearest to or farther or farthest from where the lanyard retracts into or extends out of the housing.

As used herein, the terms "front" and "back" in reference to the lanyard attachment, retractable lanyard or system for releasably storing a lanyard disclosed herein refer to any component, part, portion, or surface nearer or nearest to or farther or farthest from the aperture on the lanyard attachment.

In one embodiment of the present invention there is provided a lanyard attachment comprising a housing with a front portion and a back portion; means for releasably storing a lanyard disposed within the housing; a guide formed across a proximal end of both of the front portion and the back portion to guide the lanyard into the housing; and a holder disposed at a distal end of the housing from which an object is removably suspendable. In this embodiment the housing, the releasably storing means, the guide, and the holder independently may comprise a polymer material, a composite material, a metal, or a metal alloy or a combination thereof.

In this embodiment the means for releasably storing the lanyard may comprises a rotatable spool disposed within the housing and releasably storing the lanyard in a coiled configuration; and a manually controllable release assembly disposed through an aperture on the front portion of the housing in operable contact with the spool. In an aspect thereof the rotatable spool may comprise a first cavity with a first exteriorly flanged edge formed thereon in communication with the aperture on the front portion and containing the manually controllable button assembly therein; a second cavity with a second exteriorly flanged edge formed opposite to said first cavity and containing a torsion spring therein in operable contact with the spool; and an attachment bar fastened between the first exteriorly flanged edge and the second exteriorly flanged edge of the spool to which both ends of the lanyard are attached.

Also in this embodiment the manually controllable release assembly may comprise a first plate with an opening therethrough in communication with the aperture and a front surface affixed to an inner surface of the front portion of the housing and a back surface with a first plurality of teeth depending downwardly therefrom into the first cavity in the spool; a second plate, disposed within the first cavity with a button formed on a front surface thereof extending outwardly through the opening in the first plate and the aperture on the housing and a second plurality of teeth depending upwardly and engaging with the first plurality of teeth when the button extends out of the aperture to prevent rotation of the spool; and a compression spring disposed within the first cavity in operable contact with a back surface of the second plate and bottom surface of the first cavity such that when the button is manually depressed the second plate disengages from the first plate and compresses the spring whereby the spool rotates thereby enabling payout or retraction of the lanyard.

In addition in this embodiment the guide may comprise a stop extending outwardly from the proximal end of the housing and a pair of openings into the housing disposed in parallel along either side of the guide and with dimensions sufficient to receive the lanyard therethrough.

Furthermore in this embodiment the holder may comprise a hook and clip combination disposed at the distal end of the housing. In an aspect of this embodiment the hook and clip combination may comprise an inverted J-hook formed from the distal end of the back portion of the housing and a depressible clip movably attached to the distal end of the front portion of the housing and in movable contact with the inverted J-hook. In this embodiment the object may be a badge, identification, keys, a whistle, a writing implement, a USB flash drive, or a flashlight.

In another embodiment of the present invention there is provided a retractable lanyard comprising a housing comprising a proximal end with a lanyard guide disposed thereon and open into the housing and a distal end with a hook and clip combination disposed thereon; a rotatable spool disposed within the housing and comprising a first cavity with a first exteriorly flanged edge formed thereon, a second cavity with a second exteriorly flanged edge formed opposite to said first cavity and a lanyard attachment bar fastened between the first flanged edge and the second flanged edge of the spool; a manually controllable button assembly disposed on an outer surface of the housing and extending through an aperture thereon into the first cavity of the rotatable spool and in operable contact therewith; a torsion spring disposed within the second cavity of the rotatable spool and in operable contact therewith; and a cord looped over the lanyard guide and into the housing such that each end of the cord is secured to the lanyard attachment bar and retracted in a coiled configuration. In this embodiment the housing, the spool and the manually controllable release button independently may comprise a polymer material, a composite material, a metal, or a metal alloy or a combination thereof.

In this embodiment the lanyard guide may comprise a stop extending outwardly from the proximal end of the housing over which the cord is looped and a pair of slots formed into the housing and disposed in parallel along either side of the stop, one of the slots in the pair receiving one end of the cord therethrough. Also the hook and clip combination may comprise an inverted J-hook formed from the distal end of the housing from which an object is suspended and a depressible clip movably attached to the distal end of the housing and in movable contact with the inverted J-hook to removably secure the object thereon. Particularly, the object may be a badge, identification, keys, a whistle, a writing implement, a USB flash drive, or a flashlight.

In this embodiment the manually controllable button assembly may comprisea first plate with an opening therethrough in communication with the aperture and a front surface affixed to an inner surface of a front portion of the housing and a back surface with a first plurality of teeth depending downwardly therefrom into the first cavity in the spool; a second plate, disposed within the first cavity with a button formed on a front surface thereof extending outwardly through the opening in the first plate and the aperture on the housing and a second plurality of teeth depending upwardly and engaging with the first plurality of teeth when the button extends out of the aperture to prevent rotation of the rotatable spool; and a compression spring disposed within the first cavity in operable contact with a back surface of the second plate and bottom surface of the first cavity such that when the button is manually depressed the second plate disengages from the first plate and compresses the spring whereby the spool rotates thereby enabling payout or retraction of the cord.

In yet another embodiment of the present invention there is provided a system for releasably storing a lanyard comprising a housing with a rotatable spool contained therein and configured to releasably store the lanyard in a coiled configuration and a release button disposed through an aperture thereon in operable contact with the rotatable spool to manually control retraction or payout of the lanyard, where the housing comprises a lanyard guide formed at a proximal end of the housing and open into the housing and a hook and clip combination formed at a distal end of the housing to suspend an object therefrom.

In this embodiment the rotatable spool may contain in a first cavity formed therein a first plate attached to an inner surface of the housing such that an opening through the first plate is in communication with the aperture on the housing and a first plurality of teeth disposed thereon, a second plate with the button disposed thereon and extending through the opening in the first plate and the aperture in the housing and comprising a second plurality of teeth disposed thereon and engaged with the first plurality of teeth and a compression spring in operable contact with the second plate and bottom surface of the first cavity such that when the button is manually depressed the second plate disengages from the first plate and compresses the spring whereby the spool is free to rotate. Also the rotatable spool may contain in a second cavity formed opposite to said first cavity a torsion spring in operable contact therewith thereby enabling payout or retraction of the lanyard when the button is depressed. In addition the rotatable spool may comprise a pair of exteriorly flanged edges formed around edges of the first cavity and the second cavity and a lanyard attachment bar fastened therebetween to which both ends of the lanyard are attached.

In this embodiment the lanyard guide may comprise a stop extending outwardly from the proximal end of the housing and a pair of openings into the housing disposed in parallel along either side of the guide and with dimensions sufficient to receive the lanyard therethrough. Also the hook and clip combination may comprise an inverted J-hook formed from the distal end of the back portion of the housing; and a depressible clip movably attached to the distal end of the front portion of the housing and in movable contact with the inverted J-hook. In addition the object may be a badge, identification, keys, a whistle, a writing implement, a USB flash drive, or a flashlight.

Provided herein are devices and systems that have means for both retracting a lanyard and means for suspending an object therefrom when a user is wearing the lanyard. For example, the device may be a lanyard attachment or a retractable lanyard system that has a housing containing a means for releasably storing a lanyard, for example, a spool or rotatable spool, to which the ends of the lanyard are attached. Thus the lanyard is releasably spooled around or coiled around the outer surface of the spool. The housing and all components, parts or surfaces formed thereon or contained therein independently may comprise, be made of or be manufactured from, but not limited to, a polymer material, a composite material, a metal or a metal alloy or a combination thereof as are well-known in the art.

The housing may have any geometric shape that accommodates a guide or lanyard guide at the proximal end of the geometric shape and a holder or hook and clip combination at the distal end thereof. Generally, the housing has a front portion or front surface with an aperture or opening therethrough into the housing positioned to be in operable communication with the rotatable spool and a back portion or back surface opposite to the front portion. When worn by a user, the front portion faces outwardly and the back portion rests or lies against the user.

The housing has a guide or lanyard guide comprising a stop or lanyard stop extending away from the housing and slots, for example a pair of slots, disposed on either side of the stop and opening into the housing. The slots each have a diameter to accommodate the width of the lanyard or cord sufficient to enable the lanyard or cord to easily and smoothly retract into and be pulled away from the housing. The stop is sized and extends a distance from the proximal end of the housing so that a user may easily grasp and pull the loop end of the lanyard or cord, prevented from retracting into the housing by the guide, out from the housing to a desired length.

The rotatable spool has a pair of cavities, for example, a first cavity or front cavity and a second cavity or back cavity formed oppositely within the spool that, in an operable combination, contain the means to enable or to prevent the spool from rotating. The rotatable spool also comprises a bar disposed between a pair of flanges, such as a first exteriorly flanged edge formed on the first cavity and a second exteriorly flanged edge formed on the second cavity. A bar or lanyard attachment bar is secured, fastened or attached by its ends to the each of the pair of flanges. The ends of the lanyard or the cord are both secured around the bar so that the lanyard or cord may coil around or wrap around the spool during retraction.

The first cavity contains a manually controllable release assembly or manually controllable button assembly which when engaged prevents the torsion spring disposed in the second cavity and in operable contact with the inner surface of the spool from expanding or compressing during rotation of the spool. The manually controllable release assembly comprises a pair of toothed plates engageable one with the other, a button disposed on one of the plates and extending through an opening formed through the other of the plates and through the aperture to the outside of the front of the housing and a compression spring disposed between the pair of plates and the bottom surface of the first cavity.

Particularly, a first plate of the pair has the opening therethrough in communication with the aperture and a plurality of teeth disposed around the opening. The first plate is affixed to the inner surface of the front portion of the housing. The second plate has the button formed from a surface thereof and a plurality of teeth disposed around the button which can mesh with the plurality of teeth on the first plate. The second plate is in compressible contact with the compression spring. When the teeth on the pair of plates are meshed, the spool is held in place and unable to rotate. In operation, when the button is manually depressed, the second plate moves away from the first plate and the compression spring is compressed so that the spool may rotate. When the button is released, the compression spring moves the second plate back into contact with the first plate such that the teeth re-mesh with the teeth on the first plate and rotation of the spool is stopped. A combination of engaging and releasing the button enables a user to adjust the of lanyard to a desired length. Positioning the button on the front portion of the housing and the hook and clip combination on the distal end of the housing enables a user to easily and smoothly adjust the lanyard and/or to suspend the object from the holder without accidentally retracting the lanyard.

The housing has a holder, for example, a hook and clip combination, formed from the distal end of the housing. The hook may be an inverted J-hook formed from the back portion of the housing where the arm across the top of the J provides a surface from which an object may be suspended. The clip may be a spring clip or a clip formed so that when the arms are secured within the distal end of the front portion of the housing, the crossbar rests under the descender or tail of the J-hook. Such arrangement keeps the object secure until the clip is manually pushed down and away from the J-hook. This prevents the object from being lost while the lanyard is being worn or when the attachment is manipulated to retract the lanyard or cord into the housing. The object may be, but is not limited to, a badge or other identification, keys, a whistle, a writing implement, a USB flash drive, or a flashlight.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

Figure 4:
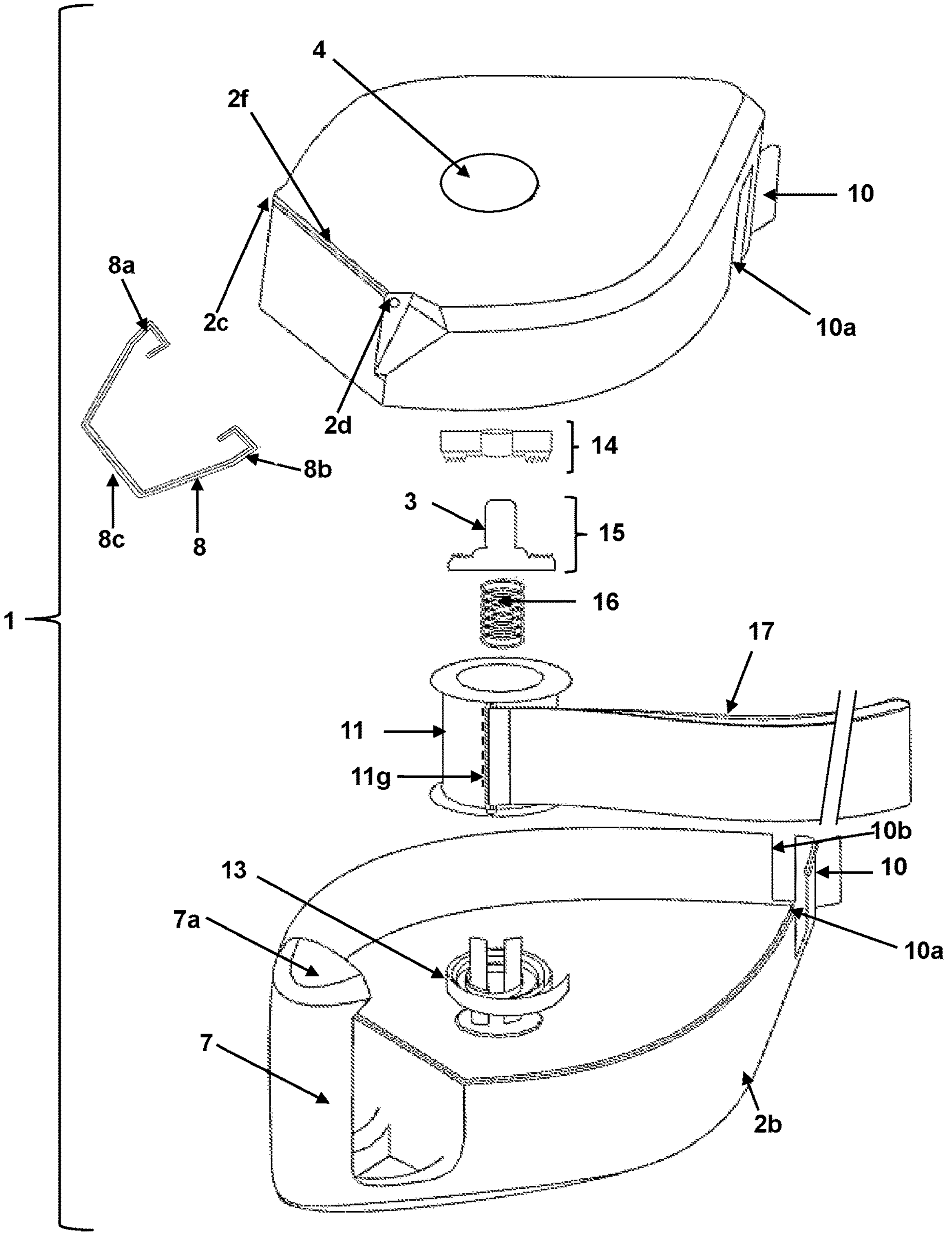
FIG. 4 shows an exploded view of the lanyard attachment.

FIG. 1 shows the lanyard attachment 1. A housing 2 comprises a front portion 2*a* and a back portion 2*b*. A button 3 is disposed through an aperture 4 on the front portion of the housing. An object holder 6 is formed by an inverted J hook 7 and clip 8 combination disposed at the distal end 5*a* of the housing. The clip ends 8*a*, 8*b* (see FIG. 4) are inserted into the front portion of the housing at 2*c*, 2*d* on the distal edge 2*e* and secured therein such that the crossbar 8*c* (see FIG. 4) on the clip is positioned under the tail or descender 7*a* of the inverted J-hook and remains there until manually depressed. A guide 9 comprises a stop 10 extending outwardly from the proximal end 5*b* of the housing and a pair of slots 10*a*, 10*b* or openings (see FIG. 4) disposed in parallel along either side of the stop through which the lanyard is directed into and out of the housing during retraction and extension thereof, respectively.

Figure 2A:
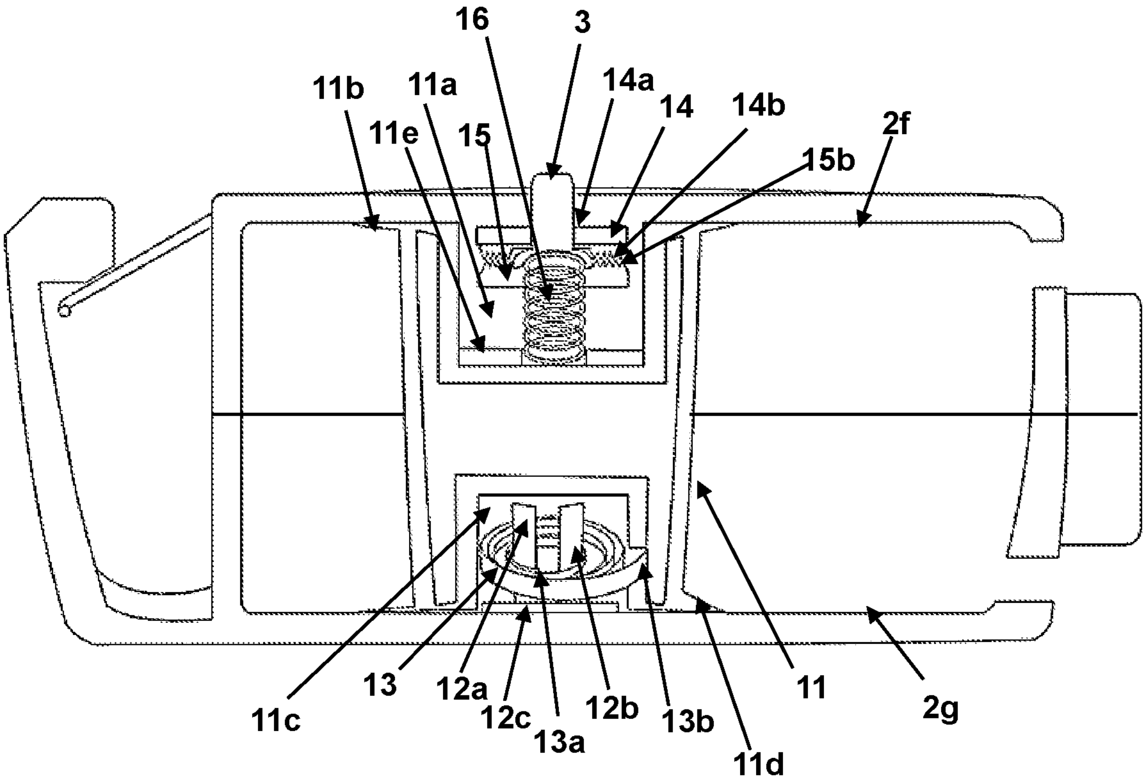
FIGS. 2A-2C are cross-sectional views of the lanyard attachment.

With continued reference to FIG. 1, FIG. 2A is a cross sectional view of the lanyard attachment 1. A rotatable spool 11 for storing the lanyard (see FIGS. 3B-3C) is disposed within the housing. The spool has a first cavity 11*a* with a first exteriorly flanged edge 11*b* thereon and a second cavity 11*c* formed opposite to the first cavity with a second exteriorly flanged edge 11*d* formed thereon. A torsion spring 13 is disposed within the second cavity and is coiled around prongs 12*a*, 12*b* which are attached to the inner surface 2*g* of the back portion via base 12*c*. The inner end 13*a* of the torsion spring is secured to prong 12*a* and the outer end 13*b* is secured to the spool through a pair of openings 11*e*, 11*f* (see FIG. 2C).

A manually controllable button assembly is disposed within the first cavity. The assembly comprises a first plate 14 affixed to the inner surface 2*f* of the front portion of the housing such that a central opening 14*a* through the first plate is aligned with and in communication with the aperture 4 (see FIG. 1) on the front portion of the housing. A first plurality of teeth 14*b* are disposed on a back surface of the first plate downwardly into the first cavity. A second plate 15 is disposed inside the first cavity and has the button 3 formed on its front surface to extend through the central opening in the first plate and into the aperture on the front portion of the housing. A second plurality of teeth 15*b* is formed on the front surface of the second plate around the button, such that the first plurality of teeth and the second plurality of teeth engage when the button extends out of the aperture into a depressible position thereby locking the spool in position and preventing its rotation. A compression spring 16 is disposed between the second plate and the bottom 11*e* of the first cavity in the spool and keeps the second plate engaged with the first plate until the button is depressed.

Figure 2B:
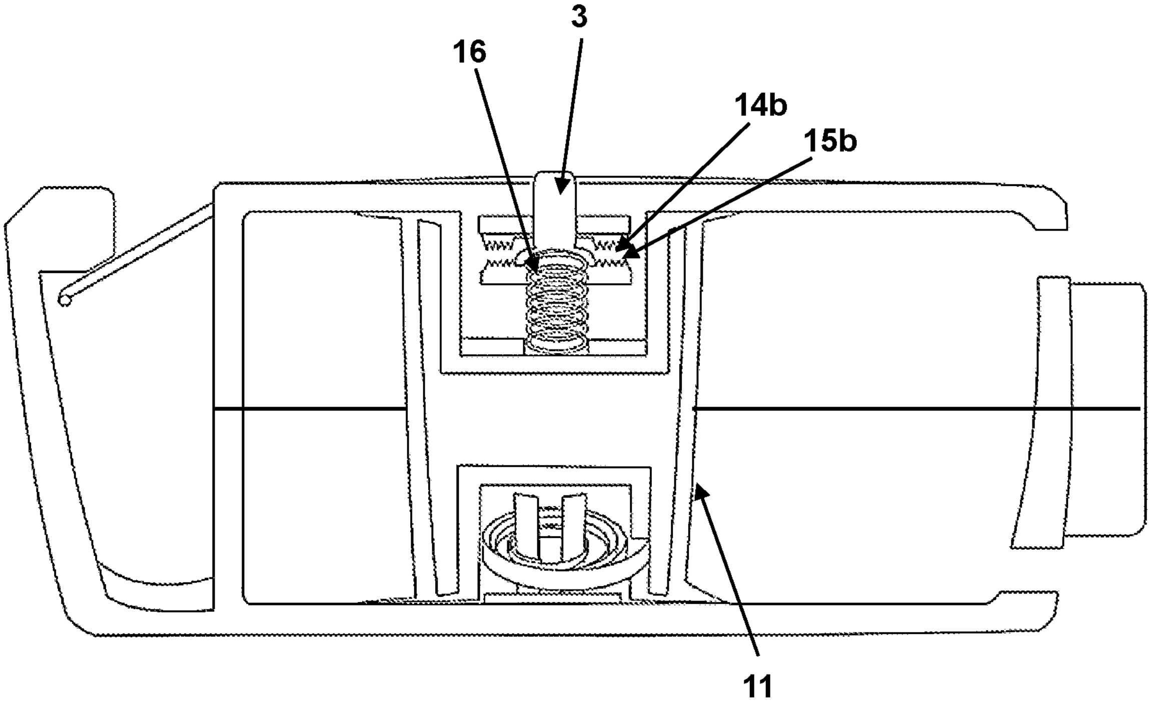

With continued reference to FIG. 2A, FIG. 2B is the cross sectional view of the lanyard attachment 1 in which button 3 is depressed to disengage the second plurality of teeth 15*b* from the first plurality of teeth 14*b* and to compress the compression spring 16 so that the spool 11 rotates freely as long as the button remains depressed. This enables retraction or payout of the lanyard.

Figure 2C:
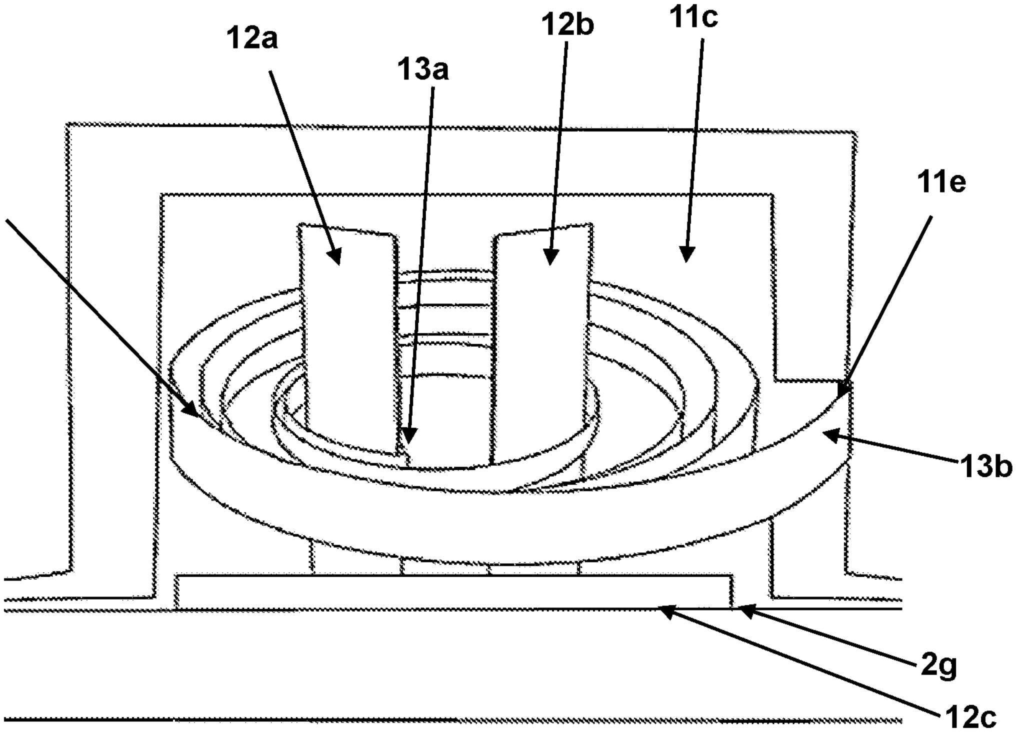

With continued reference to FIGS. 2A-2B, FIG. 2C is a magnified view of the second cavity 11*c* in the spool showing the torsion spring 13 coiled around prongs 12*a*, 12*b* supported by base 12*c* and secured to the inner surface 2*g* of the back portion of the housing. The attachment of the inner end 13*a* of the torsion spring to prong 12*a* and the outer end 13*b* of the torsion spring to openings 11*e*, 11*f* (see FIG. 3A) in the spool is clearer.

Figure 3A:
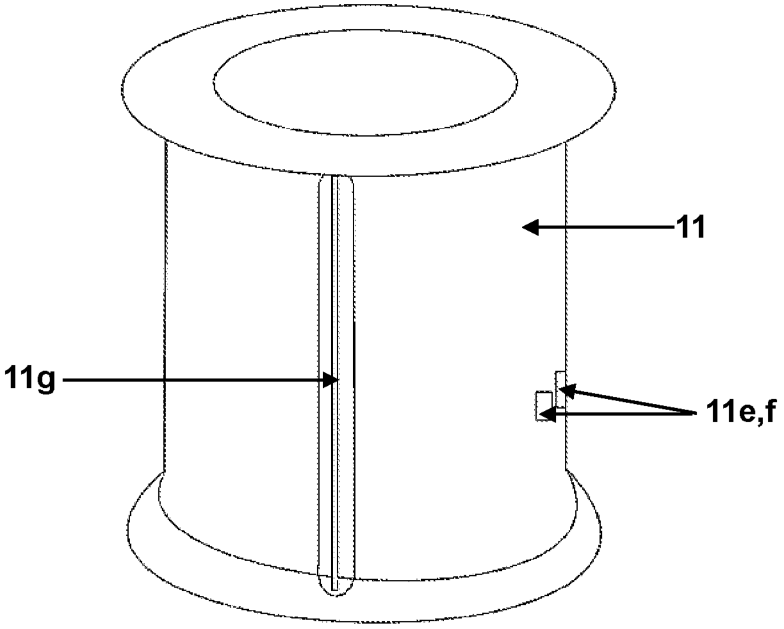
FIGS. 3A-3C shows the spool and lanyard.

FIG. 3A shows the spool 11. A bar 11*g* is secured to the first exteriorly flanged edge 11*b* at one end and to the second exteriorly flanged edge 11*d* at the other end of the spools around which the ends of the lanyard are secured (see FIG. 3B). The openings 11*e*,*f* through which the outer end of the torsion spring is secured are shown extending through to the outer surface of the spool.

Figure 3B:
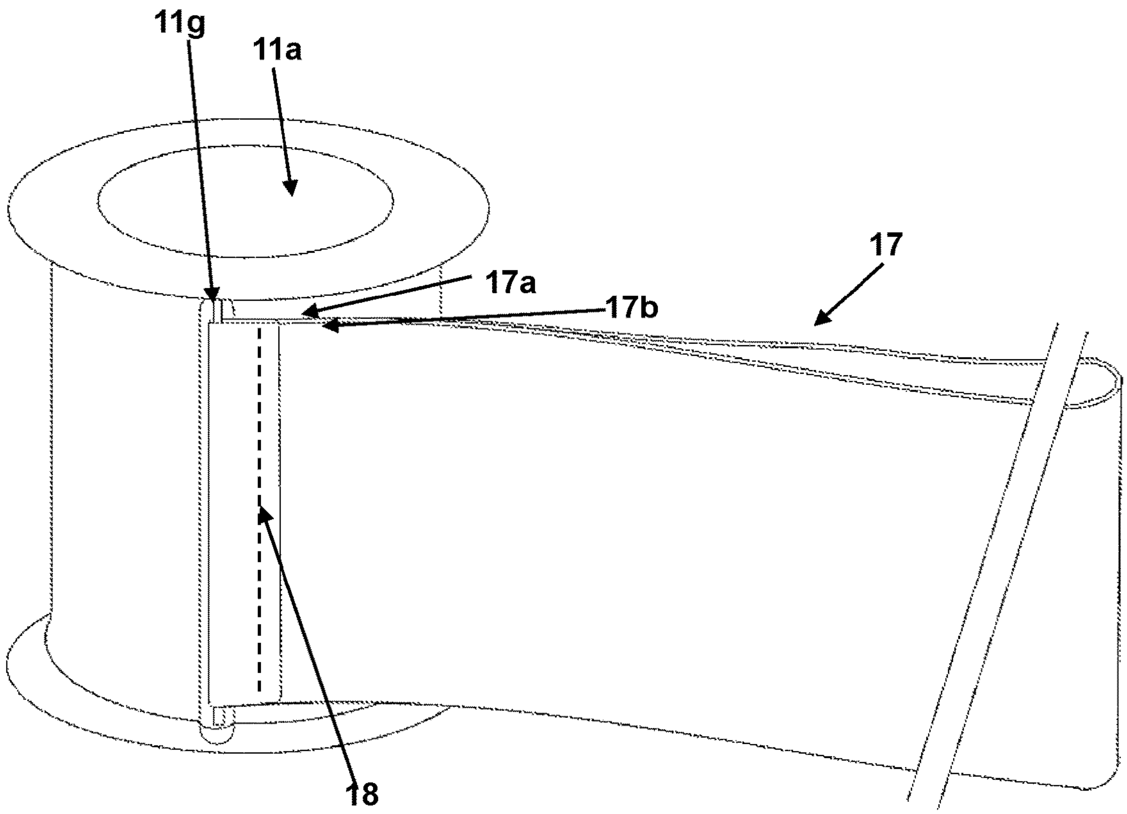

With continued reference to FIG. 3A, FIG. 3B shows the lanyard 17 in the extended configuration. Ends 17*a* and 17*b* of the lanyard are wound around bar 11*g* and secured to form seam 18.

Figure 3C:
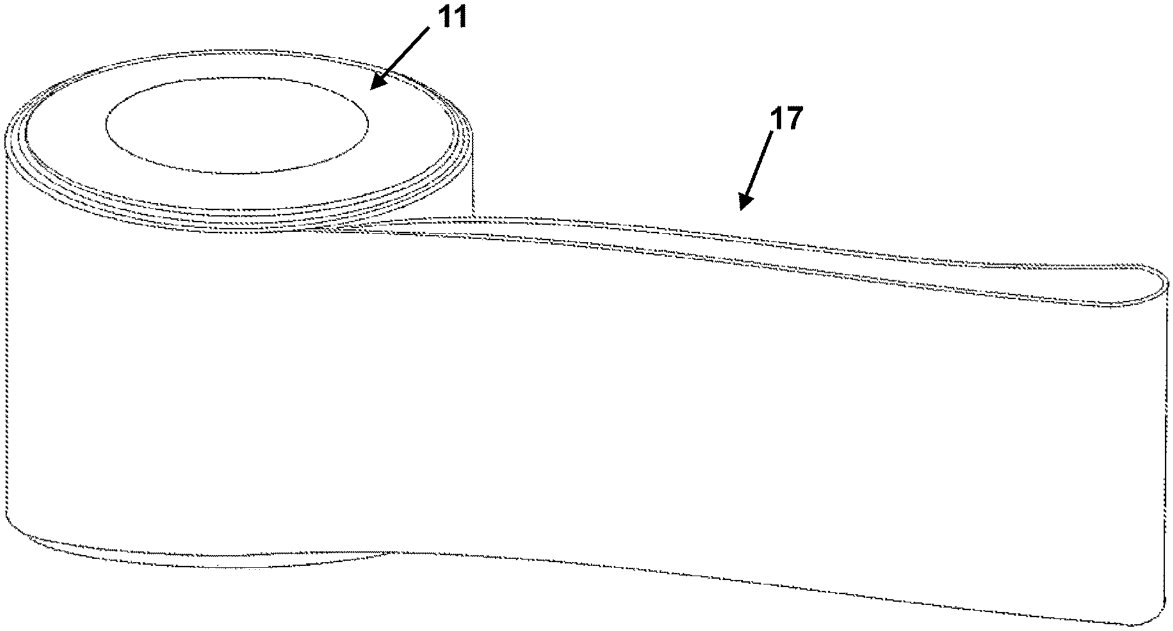

With continued reference to FIGS. 3A and 3B, FIG. 3C shows the retracted lanyard 17 in the coiled configuration around the spool 11.

With continued reference to FIGS. 1, 2A-2C and 3A, FIG. 4 is an exploded view of the lanyard attachment 1. The alignment of the first plate 14, the second plate 15 comprising button 3, and the compression spring 16 that comprise the manually controllable button assembly and of the torsion spring 13 with the aperture 4 and the spool 11 disposed within the front portion 2*a* and back portion 2*b* of the housing enables retraction, storage and extension of the lanyard 17. The lanyard 17 is secured to the bar 11*g* on the spool. The lanyard exits the housing via slots 10*a* and 10*b* disposed along either side of the stop 10. The stop and the pair of slots together direct the lanyard into and out of the housing during retraction and extension, respectively. The clip ends 8*a*, 8*b* and the crossbar 8*c* of the clip 8 are shown. The clip ends are secured within openings 2*c*, 2*d* on the edge 2*e* of the front portion 2*a* which rests under the tail 7*a* of the inverted J-hook 7.

What is claimed is:

1. A lanyard attachment, comprising:

a housing with a front portion and a back portion;

a rotatable spool disposed within the housing and releasably storing the lanyard in a coiled configuration, comprising:

a first cavity with a first exteriorly flanged edge formed thereon in communication with an aperture on the front portion and containing the manually controllable button assembly therein;

a second cavity with a second exteriorly flanged edge formed opposite to said first cavity and containing a torsion spring therein in operable contact with the rotatable spool; and an attachment bar fastened between the first exteriorly flanged edge and the second exteriorly flanged edge of the spool to which both ends of the lanyard are attached;

a manually controllable release assembly disposed through an aperture on the front portion of the housing in operable contact with the rotatable spool;

a guide formed across a proximal end of both of the front portion and the back portion to guide the lanyard into the housing; and a holder disposed at a distal end of the housing from which an object is removably suspendable.

2. The lanyard attachment of claim 1, wherein the manually controllable release assembly comprises:

a first plate with an opening therethrough in communication with the aperture and a front surface affixed to an inner surface of the front portion of the housing and a back surface with a first plurality of teeth depending downwardly therefrom into the first cavity in the spool;

a second plate, disposed within the first cavity with a button formed on a front surface thereof extending outwardly through the opening in the first plate and the aperture on the housing and a second plurality of teeth depending upwardly and engaging with the first plurality of teeth when the button extends out of the aperture to prevent rotation of the spool; and a compression spring disposed within the first cavity in operable contact with a back surface of the second plate and bottom surface of the first cavity such that when the button is manually depressed the second plate disengages from the first plate and compresses the spring whereby the spool rotates thereby enabling payout or retraction of the lanyard.

3. The lanyard attachment of claim 1, wherein the guide comprises:

a stop extending outwardly from the proximal end of the housing; and a pair of openings into the housing disposed in parallel along either side of the guide and with dimensions sufficient to receive the lanyard therethrough.

4. The lanyard attachment of claim 1, wherein the holder comprises a hook and clip combination disposed at the distal end of the housing.

5. The lanyard attachment of claim 4, wherein the hook and clip combination comprises:

an inverted J-hook formed from the distal end of the back portion of the housing; and a depressible clip movably attached to the distal end of the front portion of the housing and in movable contact with the inverted J-hook.

6. The lanyard attachment of claim 1, wherein the object is a badge, identification, keys, a whistle, a writing implement, a USB flash drive, or a flashlight.

7. The lanyard attachment of claim 1, wherein the housing, the releasably storing means, the guide, and the holder independently comprise a polymer material, a composite material, a metal, or a metal alloy or a combination thereof.

8. A retractable lanyard, comprising:

a housing comprising a proximal end with a lanyard guide disposed thereon and open into the housing and a distal end with a hook and clip combination disposed thereon;

a rotatable spool disposed within the housing and comprising a first cavity with a first exteriorly flanged edge formed thereon, a second cavity with a second exteriorly flanged edge formed opposite to said first cavity and a lanyard attachment bar fastened between the first flanged edge and the second flanged edge of the spool;

a manually controllable button assembly disposed on an outer surface of the housing and extending through an aperture thereon into the first cavity of the rotatable spool and in operable contact therewith;

a torsion spring disposed within the second cavity of the rotatable spool and in operable contact therewith; and a cord looped over the lanyard guide and into the housing such that each end of the cord is secured to the lanyard attachment bar and retracted in a coiled configuration.

9. The retractable lanyard of claim 8, wherein the lanyard guide comprises a stop extending outwardly from the proximal end of the housing over which the cord is looped and a pair of slots formed into the housing and disposed in parallel along either side of the stop, one of the slots in the pair receiving one end of the cord therethrough.

10. The retractable lanyard of claim 8, wherein the hook and clip combination comprises an inverted J-hook formed from the distal end of the housing from which an object is suspended and a depressible clip movably attached to the distal end of the housing and in movable contact with the inverted J-hook to removably secure the object thereon.

11. The retractable lanyard of claim 10, wherein the object is a badge, identification, keys, a whistle, a writing implement, a USB flash drive, or a flashlight.

12. The retractable lanyard of claim 8, wherein the manually controllable button assembly comprises:

a first plate with an opening therethrough in communication with the aperture and a front surface affixed to an inner surface of a front portion of the housing and a back surface with a first plurality of teeth depending downwardly therefrom into the first cavity in the spool;

a second plate, disposed within the first cavity with a button formed on a front surface thereof extending outwardly through the opening in the first plate and the aperture on the housing and a second plurality of teeth depending upwardly and engaging with the first plurality of teeth when the button extends out of the aperture to prevent rotation of the rotatable spool; and a compression spring disposed within the first cavity in operable contact with a back surface of the second plate and bottom surface of the first cavity such that when the button is manually depressed the second plate disengages from the first plate and compresses the spring whereby the spool rotates thereby enabling payout or retraction of the cord.

13. The retractable lanyard of claim 8, wherein the housing, the spool and the manually controllable release button independently comprise a polymer material, a composite material, a metal, or a metal alloy or a combination thereof.

14. A system for releasably storing a lanyard, comprising:

a housing with a rotatable spool contained therein and configured to releasably store the lanyard in a coiled configuration and a release button disposed through an aperture thereon in operable contact with the rotatable spool to manually control retraction or payout of the lanyard, said housing comprising a lanyard guide formed at a proximal end of the housing and open into the housing and a hook and clip combination formed at a distal end of the housing to suspend an object therefrom;

wherein said rotatable spool contains in a first cavity formed therein a first plate attached to an inner surface of the housing such that an opening through the first plate is in communication with the aperture on the housing and a first plurality of teeth disposed thereon, a second plate with the button disposed thereon and extending through the opening in the first plate and the aperture in the housing and comprising a second plurality of teeth disposed thereon and engaged with the first plurality of teeth and a compression spring in operable contact with the second plate and bottom surface of the first cavity such that when the button is manually depressed the second plate disengages from the first plate and compresses the spring whereby the spool is free to rotate;

wherein said rotatable spool contains in a second cavity formed opposite to said first cavity a torsion spring in operable contact therewith thereby enabling payout or retraction of the lanyard when the button is depressed; and wherein said rotatable spool comprises a pair of exteriorly flanged edges formed around edges of the first cavity and the second cavity and a lanyard attachment bar fastened therebetween to which both ends of the lanyard are attached.

15. The system of claim 14, wherein the lanyard guide comprises:

a stop extending outwardly from the proximal end of the housing; and a pair of openings into the housing disposed in parallel along either side of the guide and with dimensions sufficient to receive the lanyard therethrough.

16. The system of claim 14, wherein the hook and clip combination comprises:

an inverted J-hook formed from the distal end of the back portion of the housing; and a depressible clip movably attached to the distal end of the front portion of the housing and in movable contact with the inverted J-hook.

17. The system of claim 14, wherein the object is a badge, identification, keys, a whistle, a writing implement, a USB flash drive, or a flashlight.

* * * * *